Patented Feb. 23, 1937

2,071,346

UNITED STATES PATENT OFFICE 2,071,346

PROCESS OF MAKING LACTIC COMPOUNDS

Arnold H. Johnson, Samuel M. Weisberg, and James J. Johnson, Baltimore, Md., and Milton E. Parker, Danville, Ill., assignors to Research Laboratories of National Dairy Products Corporation, Inc., Baltimore, Md., a corporation of Maryland No Drawing. Application April 17, 1933, Serial No. 666,624

35 Claims. (Cl. 260—122)

This invention relates to the making of a concentrated product derived from milk such as buttermilk and skim milk and particularly useful for poultry and stock animal feed, as well as human consumption.

It is the principal object of this invention to obtain (1) a more uniform product; (2) a product of increased protein and fat content; (3) a product which may be readily stored without objectionable crystallization or caking and having excellent keeping qualities; and (4) a product having an improved appearance and lustre.

The usual mode of procedure is to collect the buttermilk and allow it to develop a titratable acidity of approximately 1.5% (lactic acid) in an unsterilized vat or container. Thereafter the whole dilute batch is preheated and pasteurized at a high temperature and suitably concentrated in a vacuum pan or other apparatus to obtain the conventional condensed buttermilk.

The product so produced is frequently objectionable in that (1) it exhibits a marked tendency to whey off in storage, i. e. visible water appears on the surface of the product and the product is no longer homogeneous, (2) when diluted, it will not remain in suspension for a required length of time and hence a feed made with the product is not homogeneous, (3) it has a dark color, (4) often during the process and in storage undesirable large coarse lactate crystals are formed and caking takes place, (5) due to the variety of organisms likely to be present, the product does not always have a clean lactic acid taste nor a constant, satisfactory, reproducible, or controlled body or consistency, and (6) because the entire dilute mass must be condensed, the time period required for concentrating frequently is too long to obtain a profitable article as the amount of heat used to concentrate is excessive.

The present invention aims to overcome these objections by producing a product which (a) is more consistent and uniform; (b) has a higher concentration of protein and fat than heretofore possible or customary; (c) has a better color, being substantially creamy in appearance; (d) has a high lustre; (e) has a more constant smooth and pasty consistency; (f) is free from crystalline formations; (g) is reproducible, that is, the treatment of the buttermilk is controlled as by introduction of a suitable culture or other means to obtain from various types of buttermilk a substantially uniform end product; (h) has a proper and determined total solids content; (i) exhibits a minimum of tendency to whey off in storage; and (j) will remain suspended when diluted with water for considerably longer periods than the conventional product.

It is, therefore, a very important object of the present invention to produce a condensed buttermilk product of smooth and pasty consistency and of correct total solids content, which condition is maintained for long storage periods. This product is characterized by a calcium lactate content reduced to a point where the product is no longer saturated with this compound. Therefore, conditions are not favorable for the formation of large coarse crystals of calcium lactate. Also the product of this invention is characterized by a high protein content which is in a semi-gelatinous form or semi-continuous phase and which acts as a protective colloid and retards the formation of large coarse crystals. These two characteristics of the condensed buttermilk product of this invention, therefore, enable the product to retain its normal consistency without objectionable crystallization and caking.

By semi-gelatinous or semi-continuous, we mean that the final product (a) has a minimum tendency to whey off with time or in storage, (b) even when considerably diluted with water, the product remains suspended for longer periods of time than is the case with the conventional product, and (c) has an improved and finer texture and high gloss in contrast to the relatively coarse texture and dull appearance of conventional condensed buttermilk.

The product of the present invention is further characterized by having the lactic acid present substantially pure and since this compound is a bacterial antiseptic, it preserves and enhances the keeping quality of the product. Moreover, the product has a highly improved taste since the acid present in it is substantially pure lactic acid.

It is a particularly important object of the invention that a given body of finished product shall have a proper and determined solids content. This is controlled by a novel hydrolyzing step whereby the hydration capacity of the proteins is reduced and a total solids content of substantially 27% or better is obtained and the concentrated product has the desired consistency and appearance.

Another object of the invention is to employ a method wherein useful chemical by-products are obtainable—for example, the lactates of calcium, magnesium, or other combinations of lactic acid.

In addition to the important objects already related, it is a further object of this invention to produce an improved powdered buttermilk product.

We shall describe several successful processes to produce the foregoing objects and for clarity shall segregate them. We shall assume, as in ordinary cases, that the sweet or sour buttermilk or skim milk or whole milk is collected and discharged into an open vat, generally of wood, having a substantial capacity and which is usually unsterilized.

Process A

This is the preferred process and we find it important to operate in the isoelectric region of the buttermilk proteins.

In this region positive and negative charges on the colloids, e. g., protein particles, are equal, and therefore they exhibit their maximum precipitability and their minimum viscosity. By reason of this condition we are able to obtain a more complete and rapid separation of the liquid and soluble portions from the colloidal or solid constituents as will be now more fully described. The pH of this isoelectric region is substantially 4.6–5.0 and if the milk has not acquired substantially this acidity, we prefer to allow it naturally to sour further. Again, this optimum acidity may be obtained by adding directly to the buttermilk a required quantity of acid, such as hydrochloric, acetic, lactic, or in fact, any of the edible acids. We prefer to operate in the isoelectric region of the buttermilk proteins for the reason that in this region, the milk proteins are especially subject to coagulation and settling.

If the pH registers substantially 4.6–5.0 (the isoelectric region), the milk has soured and has acquired the desired acidity. The vat and contents are heated with agitation, to substantially 130°–180° F. A temperature of 140° is usually sufficient and when the batch reaches this point, the heating and agitation are discontinued, and the material allowed to remain quiet and to cool.

Heating the buttermilk to 140° F. or higher has a two-fold purpose—(1) it initiates rapid sedimentation or settling of the solid matter, and (2) it provides a pasteurization treatment in that a marked destruction of the bacteria which constitute the normal flora of the buttermilk ensues. For effective sedimentation, a fairly rapid rate of cooling is preferred, which may be provided by air cooling or some controlled artificial cooling means employed. By controlled cooling, optimum settling is obtained rapidly in accordance with conditions surrounding the operation. The batch is cooled down at least to a temperature such that the solid particles coagulate and settle out and the formation of a turbid upper stratum in the batch is prevented. Normally, a drop in temperature of 5° to 10° F. the first hour, followed by 1° F. drop every hour thereafter, is satisfactory.

The batch, as will be understood, after the settling and cooling, is stratified in that there is observable an upper clear layer of whey and a lower layer containing the solids, which we will term the sludge. These solids comprising mixed colloids, principally proteins, sometimes become undesirably hydrated, and this hydration is reduced as hereinafter explained. The proteins of the sludge at this stage are in the form of discrete, discontinuous particles.

The whey layer or liquid portion of the mass contains the truly soluble parts; that is, we have determined that there is present in this layer inorganic milk salts, such as potassium and calcium phosphates, and calcium and magnesium lactates, a small amount of protein and fat and lactic acid.

The sludge comprises a portion of this whey and precipitated matter, including colloids and as such, a very large percentage of the proteins of the original buttermilk, for example, casein. These proteins are the particular colloidal constituents whose hydration reduction is accomplished by the present invention when necessary whereby the concentrated product has the desired consistency and total solids content.

The settling treatment consumes anywhere from a few hours to sixteen hours, depending on the rate of cooling. The whey layer constitutes substantially forty to fifty per cent, more or less, of the batch and the sludge the remainder.

The whey layer or clear liquid is now siphoned from the vat and is treated as will be later described.

To the sludge layer is added an organism of the Bulgaricus type or any other suitable lactic acid producing organism in amount sufficient to give a rapid development of lactic acid and crowd out with reasonable completeness any other organisms present in the buttermilk sludge which may have survived the pasteurization induced by the sedimentation temperature. This inoculation of lactic acid organisms imparts a clean lactic acid taste to the sludge, which, of course, carries on through to the final product and also controls the body of the final product, in the absence of other processing steps to change the body. The temperature is preferably maintained at substantially 100° to 125° F. and usually 115° F. and the batch agitated. The temperature, in other words, should be low enough not to kill or inhibit action of the lactic acid producing organism and high enough to insure optimum lactic acid development. In this manner, much of the lactose is utilized to form lactic acid.

This development is continued until the titratable acidity (lactic) shows 1.4%–2% and usually 1.6%–1.7%.

Upon completion of the acid development, the sludge is ready for treatment to reduce the hydration capacity of its protein which will be described hereinafter in detail and will be applicable to the sludge of all other processes to be described presently.

Process B

In this process, the buttermilk, preferably at the isoelectric point, but which may or may not be initially treated as described herein to be at the isoelectric point, is first heated with agitation in the vat to 100° to 125° F., usually 115° F. in the presence of a pure culture of the acid producing organism and the heating then discontinued. In some cases, the organism is added after the mass is brought to the desired temperature. The mass is allowed to cool and the acid to develop to the same titratable acidity as in Process A and then the batch is heated without agitation to substantially 140° F. to provide a more complete sedimentation. Sedimentation or settling with cooling as described takes place until a stratified mass is obtained having the upper and clear whey layer (substantially 40% to 50%, more or less), and the sludge layer. The whey layer is siphoned and the sludge is then ready for treatment to reduce the hydration capacity of its proteins which will be described hereinafter in detail.

This process is desirable in some cases, the lactic acid producing organism being added and the acid development accomplished prior to separation of the strata, such separation being achieved by the heating step.

Process C

The buttermilk, preferably at the isoelectric point, but which may or may not be treated as described herein to be at the isoelectric point, is initially warmed with agitation in the presence of the lactic acid producing organism to an optimum temperature, namely 100° to 125° F., preferably 115° F., and heating discontinued. If desired, the organism is added after the required temperature of the batch is reached. The batch is allowed to cool and the fermentation continued without agitation until optimum sedimentation (as determined by means of a glass window), and acid development are obtained, the latter determined by titration, namely 1.4%-2.0% and preferably 1.6%-1.7%. Thereafter, the whey and sludge are separated and the sludge is then ready for treatment to reduce the hydration capacity of its proteins which will be described hereinafter in detail.

In each of Processes A, B and C, it will be observed that we resort to the use of an organism to develop the acidity and this expedient we find reduces the time required to develop acidity over present procedure by at least twelve to sixteen hours.

Process D

In this process, we follow in general the operations outlined in Processes A, B and C, but do not add the organism, depending upon the organisms present in the buttermilk to promote the acidity. The buttermilk, preferably at the isoelectric point, but which may or may not be treated as described herein to be at the isoelectric point, is heated up to a moderate temperature, that is, the temperature at which the lactic organisms normally present in the buttermilk produce acid most rapidly, normally 100°-110° F. The acid development is obtained by permitting fermentation of the batch to continue at substantially the temperature recited or having reached the optimum desired temperature, heating is stopped and the mass allowed to stand in the vat, which is usually unsterilized, until the desired acidity is reached. The batch having settled, separation is then accomplished to obtain the whey layer and the sludge layer, and the latter is then ready for hydration of its proteins which will be described hereinafter in detail.

In this connection, the heating step referred to may be omitted and fermentation permitted to the required titratable acidity and the strata separated.

Process E

In this process, the buttermilk is brought to the isoelectric region of the proteins by adding directly to the buttermilk a required quantity of acid such as hydrochloric acid, acetic acid, lactic acid, or in fact, any of the edible acids. The buttermilk having a pH of 4.6-5.0 may now be heated to the optimum temperature which will promote rapid settling usually in the vicinity of 140° F. However, heating is optional and the mass having been brought to the required pH with or without preheating permitted to stand, since, as stated in the isoelectric region of the proteins, the desired efficient stratification will result. Thereafter the separation and further treatment of the sludge for reducing the hydration capacity of its proteins proceeds as will be described hereinafter in detail.

Each of the several processes hereinabove outlined are applicable in connection with skimmed milk or butter milk having various degrees of acidity, that is to say, milk which is termed sweet or sour.

It will be understood that the important consideration in each case is the stratification of the milk, i. e., skim milk, buttermilk or other milk and milk products at the isoelectric region of the proteins when optimum stratification is obtainable. This is true with respect to milk which is naturally soured, or soured by the addition of an organism, or by the direct addition of an edible acid.

In connection with each of Processes A, B, C, D and E, instead of concentrating with the entire mass buttermilk in the conventional way now carried out, we concentrate the sludge and reduce the hydration capacity of the proteins as set forth in the copending application entitled "Method of treating lactic fluids and product obtained therefrom", filed January 5, 1933, by Weisberg et al, Serial No. 650,364, and describe herein additional methods for reducing the hydration capacity of the proteins of the sludge, before its final heating and concentration to a desired total solids content, as will be later fully explained. The final product is an improved article which (1) is more consistent and uniform, (2) has a higher concentration of protein and fat than heretofore possible or customary, (3) has a better color, being substantially creamy in appearance, (4) has a high lustre, (5) has a more constant smooth and pasty consistency, and (6) free from crystalline formations, all as set forth in the above mentioned application of Weisberg et al., and in addition the modification of the proteins of the sludge which takes place by reason of the treatment to reduce the hydration capacity of the proteins before final heating and concentration as set forth in said pending application and herein, results in a product whose protein is in a semigelatinous form thereby imparting improved properties of high lustre and fine texture, and particularly (7) reducing to a minimum any tendency of the product to whey off in storage, and (8) allowing it to be diluted and remain in suspension for longer periods than with conventional products.

The condensed milk product obtained by reducing the hydration capacity of the proteins of the sludge of each of Processes A, B, C, D and E, and then concentrating the hydrolyzed or partially hydrolyzed sludge, is in the form of a pasty body of improved fine texture and glossy appearance. The product contains lactic acid, fat, protein, milk salts and some milk sugar, and differs from the conventional condensed buttermilk in that it has a relatively high protein and fat content. Whereas the conventional condensed buttermilk contains substantially 9% to 10% protein and 2% fat, the condensed buttermilk product of this invention has been found to contain 12½% protein and 2½% fat or better.

The concentrated or end product obtained when condensing the sludge from each of Processes A, B, C, D and E without first treating the said sludge to reduce the hydration capacity of its proteins invariably has a heavy body. This heavy body is due to the increased protein content and the hydration thereof. This hydration capacity of the colloidal constituents, e. g., the ability of the proteins to hold water, is reduced where necessary by hydrolysis which may be accomplished by resorting to (1) an enzymic digestion treatment of the milk or buttermilk mass during the sedimentation and fermentation steps of Processes A, B, C, D and E set forth above, (2) an enzymic digestion treatment or an acid hydrolysis step applicable to the sludge obtained in Processes A, B, C, D and E set forth above, (3) a heat treatment of the sludge obtained in each of the said processes. The purpose of both the enzymic digestion step (hereinafter referred to as the digestion step), the acid hydrolysis step and the heat treatment is to obtain for a given body of finished product a proper and determined solids content, usually better than 27%.

The digestion step

The digestion step involves the addition of a suitable enzyme such as pepsin in a concentration below the optimum, i. e. to accomplish partial digestion, which, in the case of pepsin, normally amounts to ¾ of an ounce per thousand pounds of sludge. In carrying out the digestion step, in some cases, we digest the original buttermilk mass, and in other cases, we digest the sludge. While the whole of the buttermilk mass or the whole of the sludge may be digested, we prefer to digest a fractional part thereof.

The preferred procedure comprises digesting part of the original buttermilk mass and then adding the digested buttermilk to the sludge obtained in each of Processes A, B, C, D and E. The mixture of the sludge mass and the digested fractional part of the original buttermilk (normally ⅕ of the original buttermilk mass, i. e. ⅕ of the total mass before its stratification into whey and sludge layers as set forth in each of Processes A, B, C, D and E above) is then heated to a high temperature, normally 180° F., which inactivates the enzyme, and transferred to a vacuum pan or other apparatus such as a centrifuge and concentrated to the desired total solids content. This treatment of the sludge with the digested buttermilk is advantageous in that it hastens removal of moisture by evaporation when treatment in vacuo is resorted to and has the effect of imparting to the finished product an improved lustre and texture due to the semi-gelatinous character of its protein.

Excellent results are obtained by following this method inasmuch as the proteins are more readily acted upon by an enzyme in the comparatively dilute solution of the buttermilk mass per se in contrast to the slower and less complete action upon the more concentrated proteins contained in the sludge mass obtained from each of Processes A, B, C, D and E.

It is not a satisfactory procedure to digest the entire buttermilk mass prior to its stratification as such method not only interferes with the stratification, but also contributes greater solid losses in the whey layer.

On the other hand, satisfactory results may be obtained by digesting a fractional portion of the sludge from one of the above processes and then mixing the hydrolyzed and unhydrolyzed portions and heating the mixture substantially to 180° F. to inactivate the enzyme and for concentration to the desired total solids content. It is also possible to hydrolyze the entire sludge mass by means of enzymic digestion before proceeding with the heat treatment to inactivate the enzyme and concentration to the desired total solids content as set forth above. However, we have found that best results are obtained by using the preferred method of digesting a fractional part of the original buttermilk mass and then mixing with the sludge for the heat treatment and concentration to the desired total solids content as described.

It should be understood, however, that in using the digestion steps described above, it is possible to inactivate and concentrate the portions of digested buttermilk or digested sludge separately, although their mixture with the unhydrolyzed sludge followed by inactivation and concentration of the mixture is preferred.

In addition to pepsin, satisfactory results may be obtained by the use of papain, trypsin, or other proteoclastic enzymes of either plant or animal origin. Since the buttermilk mass or sludge normally has an acid reaction of pH 4.6 to 5, the addition of a suitable enzyme will partially digest the protein sufficiently to allow a greater concentration of the sludge.

As we have indicated above, the mixture of unhydrolyzed sludge and fractional portion of digested buttermilk, or the mixture of unhydrolyzed and hydrolyzed sludge, or the hydrolyzed sludge in all cases is preferably heated to substantially 180° F. to inactivate the enzyme and then concentrated in vacuo, although centrifugation may also be resorted to.

Acid hydrolysis step

The acid hydrolysis step involves the addition of an edible acid, such as hydrochloric (muriatic) acid, in a concentration below the optimum, i. e., to accomplish partial hydrolysis of the hydrated proteins of the sludge, which, in the case of hydrochloric acid, normally amounts to one gallon of concentrated hydrochloric acid per thousand gallons of sludge. The acid may be added to the whole sludge mass, but is added preferably to a small portion of the sludge, normally one fourth of the entire mass, in order to hasten the hydrolysis and thus save time. The acid is preferably not added to the buttermilk mass as such addition of acid seriously affects the color of the finished product and also has the disadvantage of increasing the milk solids loss in the whey stratum. Furthermore, the acid is preferably not added to a fractional portion of the buttermilk mass, as is optional in the case of an enzyme, not only because it affects the color of the finished product, but in addition, is not as effective in hydrolyzing its proteins as it is in the case of the more concentrated proteins of the sludge. This, it will be noted, is opposite from the effects of the enzyme in the digestion step.

In addition to hydrochloric acid, equally satisfactory results may be obtained by the use of acetic acid, lactic acid, phosphoric acid, citric acid, or, in fact, any of the edible acids. While hydrochloric acid has been specified in the acid addition described above, any edible acid may be substituted although it will generally be found more satisfactory and economical to use hydrochloric acid, because (1) it has a relatively greater degree of ionization, and (2) it is relatively cheaper.

Since the sludge normally has an acid reaction of pH 4.0 to 6, the addition of an edible acid in suitable concentration to the hydrated sludge, particularly when the charge of the acid is added to a portion of the sludge mass as suggested above, will increase the hydrogen ion concentration normally to a pH 2.5 to 3.5. This increased hydrogen ion concentration obtained by the addition of acid to the sludge (hereinafter referred to as acidification of the sludge) will, upon warming of the acidified sludge, induce hydrolysis of the hydrated proteins. This hydrolysis is normally accomplished by heating the acidified sludge to a temperature of substantially 210° F., which temperature is maintained for a period of approximately 2½ to 4 hours with constant yet mild agitation. We have found that the hydrolysis step is most conveniently performed by heating the acidified sludge in a suitable hot well with direct steam injection and that the heat imparted by the condensed steam can be maintained with a mild agitation by merely "cracking" the valve supplying and controlling the steam jets. Upon completion of the hydrolysis step, it will be found that the treatment (a) has increased markedly the fluidity of the sludge, and (b) upon analysis of the treated sludge, it will be observed that its amino nitrogen content has been trebled or quadrupled when compared with that of the original untreated sludge. Both of these results constitute definite evidences of hydrolysis. In addition, the titratable acidity of the hydrolyzed sludge will be found to be appreciably less than that of the original acidified sludge. This reduction in acidity, aside from the diluting effects of steam condensed in heating the acidified sludge, is probably due to (1) vaporization of volatile acids normally present in creamery buttermilk such as carbon dioxide, acetic acid, and proprionic acid, butyric acid and other fatty acids, (2) reaction with the ammonia formed by the hydrolysis of casein, (3) the formation of lactone, lactam and lactim from lactic acid, and (4) the more complete reaction of the acid with lime and soda compounds normally present in creamery buttermilk.

The hydrolyzed sludge and the unhydrolyzed portion are then concentrated separately, or preferably as a mixture, in vacuo or in other suitable apparatus such as a centrifuge. The unhydrolyzed portion is preferably preheated normally to 160° F. before concentration in vacuo primarily to hasten the evaporation of its contained moisture. We have found that the concentration in vacuo of this mixture of hydrolyzed sludge and unhydrolyzed (hydrated) sludge, even in the ratio of one part of hydrolyzed sludge to four parts of unhydrolyzed (hydrated) sludge, not only will readily permit a concentration in vacuo to a desired total solids content, but also has the added advantage of materially hastening the removal of moisture by evaporation.

Heat treatment

As a further method of reducing hydration, the unacidulated sludge is partially hydrolyzed by heating to substantially 210° F. for a period of time sufficient to reduce the hydration capacity of the proteins and to such an extent that when the sludge is concentrated in vacuo or by centrifugation, as found most desirable, there will be found 27% total solids or better. The product will have the proper body, appearance and consistency. In general, the lower the pH of the sludge, the less time will be required for the heat treatment.

The heat treatment may be applied to the entire mass of sludge or to a portion thereof. The hydrolyzed and unhydrolyzed portions are preferably mixed and then concentrated as described.

The product obtained by concentrating the sludge prepared with the additional step of either (1) enzymic digestion, (2) acid hydrolysis, or (3) heat treatment permits readily a total solids content of substantially 27% or better. We have found that any of these additional steps of preparing the sludge for concentration are satisfactory.

While we have indicated the hydrolyzed portion as preferably constituting one-fourth of the mass, it may be smaller or larger fraction part, or the entire mass may be hydrolyzed.

Further, the step of reducing hydration of the hydrated colloids whether by digestion, or hydrolysis or heat treatment will, in some cases, be conducted on the entire mass, e. g., the sludge or the milk at any satisfactory point in the procedure, or upon any sized portion or fractional part thereof.

Whey treatment

The whey from the above processes (A to E inclusive) or that produced by the processing of milk and milk products and by-products, is useful for the manufacture of lactates of the alkali and alkali earth metals.

For this purpose, the lactic acid in the whey is neutralized with an acid-binding compound such as the hydroxide, oxide or carbonate of the particular alkali metal or alkaline earth metal desired i. e., containing the cation of the lactic compound being formed.

The whey contains lactic acid, traces of calcium lactate, lactose, phosphates and other milk salts, and a small amount of protein.

We will describe by way of example the manufacture of calcium lactate. The whey is first neutralized with calcium hydroxide, calcium oxide or calcium carbonate or combinations of these, to a pH of 7.0–7.5. The temperature of the liquor is raised to substantially 100°–110° F. Then if necessary, as where the whey is devoid of lactic organisms, a small amount of a lactic acid forming organism, such as mentioned above e. g., one of the Bulgaricus type, or any good lactic acid producing organism is added to develop acid preferably from all, or any part of the lactose, that is the lactose is converted into lactic acid.

The acidity is allowed to develop for ten to twenty-four hours, and slaked lime, unslaked lime, and/or calcium carbonate which react with the acid to form calcium lactate is added from time to time so that the pH is maintained at about 7.0, or until acid as determined by titration ceases to develop at a reasonably rapid rate indicating that substantially all of the lactose has been used up or when a test for lactose shows only a trace of this substance present. In this manner the lactic compound or lactic reaction product is formed and is present in solution in the whey. The liquor is then adjusted to neutral with the above lime compounds.

The neutral whey is now heated to substantially 180° F. to 220° F. Then it is allowed to cool and settle for substantially two hours or longer forming a sludge or sediment. In this step, the larger part of the impurities such as nitrogenous compounds and other whey constituents, foreign to the lactic compound being made, and present in the whey are carried down i. e., precipitated to the bottom of the vat in the form of a white sludge or sediment, leaving a fairly clear supernatant liquor.

It is to be observed that only substances foreign to the lactic compound being made are precipitated since under the conditions recited no precipitation of the calcium lactate formed takes place. In other words, the calcium lactate is maintained in solution in the whey.

In lieu of adding the alkali at a moderate temperature and then heating, the acidified mass is first heated to substantially 180° F. or higher. It is then adjusted to a pH of substantially 7.0 with slaked lime, unslaked lime, and/or calcium carbonate with mild agitation sufficient to adequately distribute the added alkali. Following this adjustment, the mass is allowed to cool and settle or sediment for at least two hours although longer periods of 18 to 24 hours are preferred. In this step, a considerable portion of the impurities present in the whey are carried down to the bottom of the vat in the form of a greyish white sludge or sediment leaving a fairly clear supernatant liquor.

The supernatant liquor by either process is removed by siphoning off and may if desired, be clarified for example, by centrifugation or this liquor may be condensed as in a vacuum pan, the condensed liquor allowed to crystallize, the crystals washed in a centrifugal, subsequently dissolved in water and then subjected to the second sedimentation step now to be described. The temperature of this liquor is brought if necessary to 140 to 160° F. and in the present case lime in the form of CaO or Ca(OH)$_2$ and a supplement of CaCO$_3$ if desired, is added to render the liquor alkaline and bring the pH to substantially 10 to 12. We prefer a high alkalinity, as it has been found to be helpful in the speed and effectiveness of the purification step which ensues. The added alkali is mixed with mild agitation sufficient to adequately distribute it throughout the mass of supernatant liquor. The alkalinized liquor is then allowed to stand undisturbed for a period of two to three hours during which time the remainder of the nitrogenous and other whey constituents foreign to the lactic compound being formed (calcium lactate in this case) are precipitated out and settle to the bottom of the vat in the form of a white sludge or sediment leaving a clear layer of purified supernatant liquor above. The supernatant liquor so purified is drawn as by siphoning off and neutralized with lactic acid to knock back the alkalinity.

As in the first sedimentation step, only the substances foreign to the lactic compound being formed, in this instance calcium lactate, are precipitated and the calcium lactate by reason of the conditions maintained remains in solution in the whey.

Preferably, but not necessarily, this adjustment of the purified liquor is carried to a point usually slightly on the acid side of neutrality, e. g., pH 6.5 to 6.9. Then a small amount of calcium carbonate is preferably added to bring the liquor to true neutrality.

The liquor is then transferred to a vacuum pan and concentrated, so that the volume becomes ½ to 1/7 of its original volume. It is found that below the lower limit, the concentration of the calcium lactate is so low as to cause serious losses of this salt upon crystallization. Beyond the upper limit, the concentration of the crystals is so great that the mass can only be washed with difficulty. However, if no further purification is contemplated at this point, the concentration may be carried further, for example, to 1/10 of the original volume.

*Process I*

The concentrated liquor recovered by the above treatment will in some cases be immediately permitted to crystallize, without introduction of further clarification steps, as where exceptional purity is not demanded.

*Process II*

As an alternate process, the concentrated liquor may be clarified by mechanical means such as (a) by centrifugation or (b) by filtration and then permitted to crystallize.

Normally, the concentrated liquor if reduced in vacuo to 1/7 of its original volume will contain 35% calcium lactate in the case described. It is possible to further reduce its nitrogen and chloride contents by clarifying the concentrated liquor by centrifugal means—the conventional type of centrifuge being satisfactory for such clarification. We are listing below, the comparative analyses of the concentrated liquor both with and without clarification, both of which are excellent sources of the calcium lactate and lactic acid of commerce:

| Constituents | Concentrated Liquor | |
|---|---|---|
| | Not clarified | Clarified |
| | Process I | Process II |
| Phosphates | None to traces | None to traces. |
| Sulphates | None to traces | None to traces. |
| Chlorides | 0.20–0.60% | 0.20–0.40%. |
| Nitrogen | 0.10–0.30% | 0.10–0.20%. |
| Lactose | None | None. |
| Fatty acids | Slight traces | None. |
| Solubility in water | Slightly turbid | Clear solution. |

Where subsequent clarification is resorted to, particularly filtration, the acidity of the concentrated liquor is adjusted where necessary so that the subsequent filtration proceeds easily, using lactic acid if necessary so that the pH falls within the range of 6–7.5, that is, either neutral or on the acid side of neutrality.

This adjustment will be resorted to with Process II, and with Process III now to be described.

*Process III*

If exceptional purity is required, it is necessary to resort to additional clarification. In such instances, the adjusted liquor is preferably concentrated in vacuo to ¼ of its original volume.

The liquor having been adjusted as described in the preceding paragraphs, there is now added to this adjusted concentrate from 1 to 3% of a good vegetable charcoal such as "Norite" to decolorize and clarify the liquor. The whole is now heated to substantially 200° F. to 220° F. and held at this temperature approximately 30 minutes with stirring. This hot liquor is preferably then passed through a filter press, which may have a layer of some filter aid, whereupon a highly purified concentrated calcium lactate solution is obtained. The solution will now be permitted to crystallize.

The liquors and crystallized compounds produced by Processes I, II and III, have increasing purity, Process III being employed where lactates of the highest purity are desired.

*Crystallization treatment*

We will now describe the crystallization treatment applicable to the Processes I, II and III above mentioned. The concentrated liquor without further purification as in Process I, or purified, clarified and decolorized as mentioned in connection with Processes II and III or by any other suitable methods, may if desired, be seeded fairly generously with crystals of pure calcium lactate, stirred and kept in a cool place to speed crystallization.

In some cases, we dispense with seeding and stirring as where operation time is not important and the concentrate is simply allowed to crystallize in a cool place.

Under each of these various conditions for crystallization, a mass of calcium lactate crystals appears. These crystals are washed as by centrifuging, employing a stream of ice water if desired. If necessary, they are further purified by recrystallization i. e., suspended in a small or appropriate amount of hot water and again permitted to crystallize. The crystals obtained upon recrystallization are washed in the same manner as just mentioned above.

The washed crystals are then dried—the temperature of drying being determined by the type of calcium lactate crystal desired. At room temperature (25° C.), the calcium lactate will contain 5 moles of water and have the chemical formula of $Ca(C_3H_5O_3)_2.5H_2O$;—at 100° C., the calcium lactate will contain 2 moles of water and have the chemical formula of

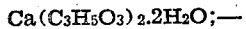

$Ca(C_3H_5O_3)_2.2H_2O$;— and at 125° C., the calcium lactate will be anhydrous and have the chemical formula of $Ca(C_3H_5O_3)_2$.

The washed crystals of the highly purified liquor of Process III described above when dried at 25° C. will be found upon analysis to have the following approximate composition:

| | |
|---|---|
| Moisture @ 120° C | 27.8% |
| Anhydrous lactate | 98.8% |
| Total calcium as $Ca(C_3H_5O_3)_2$ | 72.0% |
| Nitrogen | 0.02% |
| Chlorine | 0.09% |
| Lactose | None |
| Fatty acids | None |
| Sulphates | None |
| Phosphates | None |
| Heavy metals | None |
| Solubility in water | Clear |

It should be noted that the calcium lactate recovery process is exceptionally economical (1) because it employs only low cost reagents and (2) because the sludge or sediment obtained in each of the sedimentation steps, being rich in calcium and phosphorus usually in the form of calcium phosphate, other milk salts and protein will be useful to enrich the primary products, namely, the condensed milk products. In other words, the sediment or sludge is collected during the process of forming the lactic compound, and is added at any suitable point in the process of A to E referred to above. For example, the sludges or sediments obtained in the manufacture of calcium lactate will be added to the milk or buttermilk sludges produced by processes A, B, C, D and E.

The procedure outlined above for the manufacture of calcium lactate will be substantially followed for the making of magnesium, strontium and barium lactates.

In explanation of the reaction which takes place by the whey treatment above outlined, we would say that the calcium compounds added during the process, combine with the lactic acid under the conditions maintained to produce the calcium lactate. We believe that substantially all of the calcium lactate is formed in the initial neutralizing and succeeding adjustment of the liquor that is, when pH of the whey has been adjusted to pH 7.0 and the fermentation is ended.

While we have referred in the manufacture of calcium lactate to the addition of calcium compounds throughout the process such as the oxide, hydroxide and carbonate, it will be understood that the cations will vary in accordance with the particular compound under production. That is to say, we will use the oxide, hydroxide and carbonate of the appropriate alkaline metal or alkaline earth metal in accordance with the metallic member or cation of the particular lactate compound being prepared.

Further it will also be understood that while the procedure outlined above is applicable to the whey recovered from milk or buttermilk as outlined in processes A, B, C, D and E above, it is equally applicable to whey produced by the processing of milk and milk products and by-products e. g., whey obtained from milk or cream in the manufacture of cheese, casein and any other milk product wherein whey is a by-product of manufacture.

The term "milk" as used in the claims is, therefore, employed in its generic sense.

Dried milk product

We have found that an improved dried milk product or feed can be produced by taking the milk or buttermilk sludge, either with or without additional or preliminary concentration, and subjecting it to any suitable drying process as by a hot roller. This sludge should be prepared by a sedimentation process wherein no extensive acid fermentation has taken place in order to avoid lumping or caking of the final product. This can be accomplished, for example, by applying Process A, described above, to the buttermilk mass, but eliminating the steps of fermenting with a lactic culture or the addition of an enzyme. Furthermore, it is desirable to use a higher sedimentation or stratification temperature, usually 160° F. to obtain a more concentrated sludge.

The dried product is then powdered in any suitable apparatus. The process of forming the dried buttermilk product, as with the condensed buttermilk product and process set forth above, is preferably a continuous operation. That is, the sludge with or without reduction of its hydration capacity is dried, and powdered as consecutive steps. The dried and powdered buttermilk product so obtained has the important advantages of (1) having a lighter, more attractive appearance, being substantially white; (2) having a higher concentration of protein and fat than heretofore possible or customary; and (3) being free from the tendency to lump or cake.

The dried milk or buttermilk of this invention contains lactic acid, lactose, fat, protein, milk salts and other milk solids, and differs from the conventional dried buttermilk or milk in that it has a higher protein and fat content than heretofore possible or customary. Whereas the conventional dried buttermilk contains substantially 35% protein and 7% fat, the dried buttermilk of this invention has been found to contain 45% protein and 8% fat or better.

We claim:
1. The process of making lactic compounds from whey, comprising forming the lactic compound in solution in the whey, removing undesired nitrogenous substances from the solution, alkalinating the solution and rendering remaining undesired substances removable, removing such substances, and neutralizing the solution.

2. The process of making lactic compounds from whey, comprising adding to the whey and reacting with the lactic acid therein an acid-binding compound containing the cation of the lactic compound to be formed, adjusting the whey solution of the reaction product to substantial neutrality, removing undesired nitrogenous substances from the whey solution, alkalinating the solution and rendering remaining undesired substances removable, removing such substances, and neutralizing the solution.

3. The process of making lactic compounds from whey, comprising adding to the whey and reacting with the lactic acid therein an acid-binding compound containing a cation of the lactic compound to be formed, converting lactose contained in the whey into lactic acid and continuing the reaction, removing undesired nitrogenous substances from the whey solution, alkalinizing the solution and rendering remaining undesired substances separable therefrom, withdrawing said undesired substances, and neutralizing the whey solution.

4. The process of making lactic compounds from whey comprising adding to the whey and reacting with the lactic acid therein an acid-binding compound containing the cation of the lactic compound to be formed comprising one of a group of compounds consisting of oxides, hydroxides and carbonates of the alkali metals and the alkali earth metals, alkalinating the whey solution of the reaction product with one of a group of compounds consisting of the oxides, hydroxides and carbonates of the alkali metals and alkali earth metals, removing undesired substances from the whey solution, and neutralizing the solution.

5. The process of making calcium lactate compounds from whey comprising adding to the whey and reacting with the lactic acid therein an acid-binding compound containing the cation of the lactic compound to be formed comprising one of a group of compounds consisting of the oxides, hydroxides and carbonates of calcium, adjusting the whey solution of the reaction product to substantial neutrality with one of a group of compounds consisting of the oxides, hydroxides and carbonates of calcium, removing undesired nitrogenous substances from the whey solution, alkalinating the solution, removing remaining undesired substances, and neutralizing the solution.

6. The process of treating whey to form lactic compounds which comprises treating the whey with one of a group of compounds consisting of the oxides, hydroxides and carbonates of the alkali metals and alkali earth metals and lactic microorganisms to convert its contained lactose into lactic acid and lactic compounds, heating the acidified whey to a temperature of substantially 180° F. or higher, adjusting the heated whey with one of a group of compounds consisting of the oxides, hydroxides and carbonates of the alkali metals and alkali earth metals to a pH substantially neutral, precipitating nitrogenous and other whey constituents foreign to the lactic compound being formed, removing the supernatant liquor, alkalinizing the liquor with one of a group of compounds consisting of the oxides and hydroxides of the alkali metals and alkali earth metals to a pH substantially 10–12, purifying the alkalinized liquor by precipitating and removing nitrogenous and other whey constituents foreign to the compound being formed, adjusting the pH of the purified liquor to substantially neutral with lactic acid, concentrating the adjusted liquor so that its volume is reduced and permitting the concentrated liquor to crystallize.

7. The process of treating whey to form lactic compounds which comprises treating the whey with one of a group of compounds consisting of the oxides, hydroxides and carbonates of the alkali metals and alkali earth metals and lactic microorganisms to convert its contained lactose into lactic acid and lactic compounds, heating the acidified whey to a temperature of substantially 180° F. or higher, adjusting the heated whey with one of a group of compounds consisting of the oxides, hydroxides and carbonates of the alkali metals and alkali earth metals to a pH substantially neutral, precipitating nitrogenous and other whey constituents foreign to the lactic compound being formed, removing the supernatant liquor, alkalinizing the liquor with one of a group of compounds consisting of the oxides and hydroxides of the alkali metals and alkali earth metals to a pH substantially 10–12, purifying the alkalinized liquor by precipitating and removing nitrogenous and other whey constituents foreign to the compound being formed, adjusting the pH of the purified liquor to substantially neutral with lactic acid, concentrating the adjusted liquor so that its volume is reduced, clarifying by mechanical means and permitting the clarified liquor to crystallize.

8. The process of treating whey to form lactic compounds which comprises treating the whey with one of a group of compounds consisting of the oxides, hydroxides and carbonates of the alkali metals and alkali earth metals and lactic microorganisms to convert its contained lactose into lactic acid and lactic compounds, heating the acidified whey to a temperature of substantially 180° F. or higher, adjusting the heated whey with one of a group of compounds consisting of the oxides, hydroxides and carbonates of the alkali metals and alkali earth metals to a pH substantially neutral, precipitating nitrogenous and other whey constituents foreign to the lactic compound being formed, removing the supernatant liquor, alkalinizing the liquor with one of a group of compounds consisting of the oxides and hydroxides of the alkali metals and alkali earth metals to a pH substantially 10–12, purifying the alkalinized liquor by precipitating and removing nitrogenous and other whey constituents foreign to the compound being formed, adjusting the pH of the purified liquor to substantially neutral with lactic acid, concentrating the adjusted liquor so that its volume is reduced, treating the concentrated liquor with a suitable clarifying agent, filtering and crystallizing the filtered liquor, and washing the crystals with pure cold water to remove last traces of impurities and mother liquor.

9. The process of treating whey for the production of lactic compounds which comprises treating the whey with a compound selected from a group consisting of the oxides, hydroxides and carbonates of the alkali metals and alkali earth metals, so that the reaction becomes approximately neutral, converting the lactose present into lactic acid, adjusting the whey to substantial neutrality, heating the neutral whey to a temperature of substantially 180° F. or higher and precipitating nitrgenous and other whey constituents foreign to the lactic compound, removing the supernatant liquor, rendering it alkaline to a pH of substantially 10-12, and producing sedimentation of the remaining nitrogenous and other whey constituents foreign to the lactic compound being formed, adjusting the pH of the purified liquor to substantially neutral with lactic acid, concentrating the adjusted liquor so that its volume is reduced, and permitting the concentrated lactate solution to crystallize.

10. The process of treating milk for the production of lactic compounds which comprises bringing the milk to the isoelectric region of the milk protein, heating the milk to form a stratified mass comprising layers of whey and sludge respectively, separating one from the other, treating the whey with a compound selected from a group consisting of the oxides, hydroxides and carbonates of the alkali metals and alkali earth metals so that the reaction becomes approximately neutral, bringing to a temperature optimum for production of lactic acid by lactic microorganisms, adding lactic microorganisms to convert any residual lactose present into lactic acid, adjusting the whey with a compound selected from a group consisting of oxides, hydroxides and carbonates of the alkali metals and alkali earth metals to a reaction substantially neutral, heating the neutral whey to a temperature of substantially 180° F. or higher, precipitating nitrogenous and other whey constituents foreign to the lactic compound, removing the supernatant liquor, bringing its temperature to 140 to 160° F., rendering the liquor alkaline with a compound selected from a group consisting of the oxides and hydroxides of the alkali metals and alkali earth metals to a pH substantially 10-12, and sedimenting the nitrogenous and other whey constituents foreign to the lactic compound being formed, adjusting the pH of the purified liquor to substantially neutral with lactic acid, concentrating the adjusted liquor in a vacuum so that its volume is reduced, and permitting the concentrated lactate solution to crystallize.

11. The process of treating milk for the production of lactic compounds which comprises bringing the milk to the isoelectric region of the milk proteins, in which region the milk proteins are especially subject to coagulation and settling, heating the milk to form a stratified mass comprising layers of whey and sludge respectively, separating one from the other, treating the whey with one of a group of compounds consisting of the oxides, hydroxides and carbonates of the alkali metals and alkali earth metals and lactic microorganisms to convert its contained lactose into lactic acid, heating the acidified whey to a temperature of substantially 180° F. or higher, adjusting the heated whey with one or more of a group consisting of the oxides, hydroxides and carbonates of the alkali metals or alkali earth metals to a pH substantially neutral, precipitating nitrogenous and other whey constituents foreign to the lactic compound being formed, removing the supernatant liquor and alkalinizing it with one or more of a group consisting of the oxides and hydroxides of the alkali metals or alkali earth metals to a pH substantially 10-12, purifying the alkalinized liquor by precipitating and removing nitrogenous and other whey constituents foreign to the lactic compound being formed, adjusting the pH of the purified liquor to substantially neutral with lactic acid, concentrating the adjusted liquor so that its volume is reduced, and permitting the concentrated liquor to crystallize.

12. The process of treating milk for the production of lactic compounds which comprises bringing the milk to the isoelectric region of the milk proteins, in which region the milk proteins are especially subject to coagulation and settling, heating the milk to form a stratified mass comprising layers of whey and sludge respectively, separating one from the other, treating the whey with one or a group of compounds consisting of the oxides, hydroxides and carbonates of the alkali metals and alkali earth metals and lactic microorganisms to convert its contained lactose into lactic acid, heating the acidified whey to a temperature of substantially 180° F. or higher, adjusting the heated whey with one or more of a group consisting of the oxides, hydroxides and carbonates of the alkali metals or alkali earth metals to a pH substantially neutral, precipitating nitrogenous and other whey constituents foreign to the lactic compound being formed, removing the supernatant liquor and alkalinizing it with one or more of a group consisting of the oxides and hydroxides of the alkali metals or alkali earth metals to a pH substantially 10-12, purifying the alkalinized liquor by precipitating and removing nitrogenous and other whey constituents foreign to the lactic compound being formed, adjusting the pH of the purified liquor to substantially neutral with lactic acid, concentrating the adjusted liquor so that its volume is reduced, clarifying by mechanical means, and permitting the clarified liquor to crystallize.

13. The process of treating milk for the production of lactic compounds which comprises bringing the milk to the isoelectric region of the milk proteins, in which region the milk proteins are especially subject to coagulation and settling, heating the milk to form a stratified mass comprising layers of whey and sludge respectively, separating one from the other, treating the whey with one of a group of compounds consisting of the oxides, hydroxides and carbonates of the alkali metals and alkali earth metals and lactic microorganisms to convert its contained lactose into lactic acid, heating the acidified whey to a temperature of substantially 180° F. or higher, adjusting the heated whey with one or more of a group consisting of the oxides, hydroxides and carbonates of the alkali metals or alkali earth metals to a pH substantially neutral, precipitating nitrogenous and other whey constituents foreign to the lactic compound being formed, removing the supernatant liquor and alkalizing it with one or more of a group consisting of the oxides and hydroxides of the alkali metals or alkali earth metals to a pH substantially 10-12, purifying the alkalinized liquor by precipitating and removing nitrogenous and other whey constituents foreign to the lactic compound being formed, adjusting the pH of the purified liquor to substantially neutral with lactic acid, concentrating the adjusted liquor so that its volume is reduced, treating the concentrated liquor with a suitable clarifying agent, filtering and crystallizing the filtered liquor, and washing the crystals with pure cold water to remove last traces of impurities and mother liquor.

14. The process of treating buttermilk for the production of lactic compounds which comprises stratifying the mass into a whey layer and a sludge layer, separating one from the other, treating the whey with one of a group of compounds consisting of the oxides and hydroxides and carbonates of the alkali metals and alkali earth metals and lactic microorganisms to convert its contained lactose into lactic acid, heating the acidified whey to a temperature of substantially 180° F. or higher, adjusting the heated whey with one of a group of compounds consisting of the oxides, hydroxides and carbonates of the alkali metals or alkali earth metals to a pH substantially neutral, precipitating nitrogenous and other whey constituents foreign to the lactic compound being formed, removing the supernatant liquor, alkalinizing the liquor with one of a group of compounds consisting of the oxides and hydroxides of the alkali metals and alkali earth metals to a pH substantially 10–12, purifying the alkalinized liquor by precipitating and removing nitrogenous and other whey constituents foreign to the lactic compound being formed, adjusting the pH of the purified liquor to substantially neutral with lactic acid, concentrating the adjusted liquor so that its volume is reduced and permitting the concentrated liquor to crystallize.

15. The process of treating buttermilk for the production of lactic compounds which comprises stratifying the mass into a whey layer and a sludge layer, separating one from the other, treating the whey with one of a group of compounds consisting of the oxides, hydroxides and carbonates of the alkali metals and alkali earth metals and lactic microorganisms to convert its contained lactose into lactic acid, heating the acidified whey to a temperature of substantially 180° F. or higher, adjusting the heated whey with one of a group of compounds consisting of the oxides, hydroxides and carbonates of the alkali metals or alkali earth metals to a pH substantially neutral, precipitating nitrogenous and other whey constituents foreign to the lactic compound being formed, removing the supernatant liquor, alkalinizing the liquor with one of a group of compounds consisting of the oxides and hydroxides of the alkali metals and alkali earth metals to a pH substantially 10–12, purifying the alkalinized liquor by precipitating and removing nitrogenous and other whey constituents foreign to the lactic compound being formed, adjusting the pH of the purified liquor to substantially neutral with lactic acid, concentrating the adjusted liquor so that its volume is reduced, clarifying by mechanical means and permitting the clarified liquor to crystallize.

16. The process of treating buttermilk for the production of lactic compounds which comprises stratifying the mass into a whey layer and a sludge layer, separating one from the other, treating the whey with one of a group of compounds consisting of the oxides, hydroxides and carbonates of the alkali metals and alkali earth metals and lactic microorganisms to convert its contained lactose into lactic acid, heating the acidified whey to a temperature of substantially 180° F. or higher, adjusting the heated whey with one of a group of compounds consisting of the oxides, hydroxides and carbonates of the alkali metals or alkali earth metals to a pH substantially neutral, precipitating nitrogenous and other whey constituents foreign to the lactic compound being formed, removing the supernatant liquor, alkalinizing the liquor with one of a group of compounds consisting of the oxides and hydroxides of the alkali metals and alkali earth metals to a pH substantially 10–12, purifying the alkalinized liquor by precipitating and removing nitrogenous and other whey constituents foreign to the lactic compound being formed, adjusting the pH of the purified liquor to substantially neutral with lactic acid, concentrating the adjusted liquor so that its volume is reduced, treating the concentrated liquor with a suitable clarifying agent, filtering and crystallizing the filtered liquor, and washing the crystals with pure cold water to remove last traces of impurities and mother liquor.

17. The process of making lactic compounds from whey, comprising forming lactic acid from the lactose present, reacting lactic acid present in the whey with an acid-binding compound containing the cation of the lactic compound being formed, adjusting the whey solution to substantial neutrality, treating the solution to render undesired nitrogenous substances separable therefrom, separating such undesired substances from the solution, alkalinating the solution to render remaining undesired substances removable, removing such substances, and neutralizing the solution.

18. The process of making lactic compounds from whey, comprising forming lactic acid from the lactose present, reacting lactic acid with an acid-binding compound containing the cation of the lactic compound being formed, adjusting the whey solution to substantial neutrality, precipitating nitrogenous and other whey constituents foreign to the lactic compound, withdrawing the supernatant liquor, alkalinizing the whey solution, removing the nitrogenous and other whey constituents foreign to the lactic compound, and neutralizing the whey solution with lactic acid.

19. The process of making lactic compounds from whey, comprising forming lactic acid from the lactose present, reacting lactic acid with an acid-binding compound containing the cation of the lactic compound being formed, adjusting the whey solution to substantial neutrality, precipitating nitrogenous and other whey constituents foreign to the lactic compound, withdrawing the supernatant liquor, alkalinizing the whey solution, removing the nitrogenous and other whey constituents foreign to the lactic compound, and neutralizing the whey solution with lactic acid, concentrating the whey solution, crystallizing the concentrate, washing the crystals, and drying the crystals.

20. The process of making lactic compounds from whey, comprising forming lactic acid from the lactose present, reacting lactic acid with an acid-binding compound containing the cation of the lactic compound being formed, adjusting the whey solution to substantial neutrality, precipitating nitrogenous and other whey constituents foreign to the lactic compound, withdrawing the supernatant liquor, alkalinizing the whey solution, removing the nitrogenous and other whey constituents foreign to the lactic compound, neutralizing the whey solution with lactic acid, concentrating the whey solution, crystallizing the resultant concentrate, washing the crystals, redissolving the crystals, recrystallizing and drying the crystals.

21. The process of making lactic compounds from whey, which comprises forming the lactic compound in solution in the whey, precipitating undesirable substances from the whey while the whey is substantially in a condition of neutrality, separating out the supernatant liquor with the lactic compound in solution therein, alkalinating the supernatant liquor, precipitating remaining undesired substances from the whey, and neutralizing the whey.

22. The process of making lactic compounds from whey, which comprises forming the lactic compound in solution in the whey, precipitating undesirable substances from the whey while the whey is substantially in a condition of neutrality, separating out the supernatant liquor with the lactic compound in solution therein, alkalinating the supernatant liquor, precipitating remaining undesired substances from the whey, separating out the supernatant liquor, filtering the supernatant liquor, neutralizing the filtered alkalinated liquor, and concentrating the liquor.

23. The process of making lactic compounds from whey, which comprises forming the lactic compound in solution in the whey, precipitating undesirable substances from the whey while the whey is substantially in a condition of neutrality, separating out the supernatant liquor with the lactic compound in solution therein, alkalinating the supernatant liquor, precipitating remaining undesired substances from the whey, separating out the supernatant liquor, filtering the supernatant liquor, neutralizing the filtered alkalinated liquor with lactic acid, and concentrating the liquor.

24. The process of making lactic compounds from whey, which comprises forming the lactic compound in solution in the whey, precipitating undesirable substances from the whey while the whey is substantially in a condition of neutrality, removing the supernatant liquor with the lactic compound in solution therein, alkalinating the supernatant liquor, precipitating remaining undesired substances from the whey, separating out the supernatant liquor, neutralizing the supernatant liquor, and concentrating the liquor.

25. The process of making lactic compounds from whey, which comprises forming the lactic compound in solution in the whey, precipitating undesirable substances from the whey while the whey is substantially in a condition of neutrality, separating out the supernatant liquor with the lactic compound in solution therein, alkalinating the supernatant liquor, precipitating remaining undesired substances from the whey, separating out the supernatant liquor, and neutralizing the liquor with lactic acid.

26. The process of making lactic compounds from whey comprising adding to the whey and reacting with the lactic acid therein an acid-binding compound containing the cation of the lactic compound to be formed and adjusting the whey solution of the reaction product to substantial neutrality, separating out nitrogenous and other whey constituents foreign to the lactic compound, alkalinizing the whey solution, separating out nitrogenous and other whey constituents foreign to the lactic compound from the alkalinated liquor, and adjusting the alkalinated whey solution to substantial neutrality.

27. The process of making lactic compounds from whey comprising adding to the whey and reacting with the lactic acid therein an acid-binding compound containing the cation of the lactic compound to be formed, treating the solution to render undesired nitrogenous substances separable therefrom, separating such undesired substances from the solution, alkalinating the solution to render remaining undesired substances removable, removing such substances, and neutralizing the solution.

28. The process of making lactic compounds from whey, comprising forming lactic acid from the lactose present, reacting the lactic acid with an acid-binding compound containing the cation of the lactic compound being formed, adjusting the whey solution to substantial neutrality, precipitating nitrogenous and other whey constituents foreign to the lactic compound, withdrawing the supernatant liquor, alkalinizing the whey solution, removing the nitrogenous and other whey constituents foreign to the lactic compound, and neutralizing the whey solution.

29. The process of making lactic compounds from whey comprising adding to the whey and reacting with the lactic acid therein an acid-binding compound containing the cation of the lactic compound to be formed comprising one of a group of compounds consisting of oxides, hydroxides and carbonates of the alkali metals and the alkali earth metals, adjusting the whey solution of the reaction product to substantial neutrality with one of a group of compounds consisting of the oxides, hydroxides and carbonates of the alkali metals and alkali earth metals, removing undesired nitrogenous substances from the whey solution, alkalinating the solution, removing undesired substances from the whey solution, and neutralizing the solution.

30. The process of making lactic compounds from whey comprising adding to the whey and reacting with the lactic acid therein an acid-binding compound containing the cation of the lactic compound to be formed, heating the solution to render undesired substances separable therefrom, separating undesired substances from the solution, alkalinating the solution to render remaining undesired substances removable, removing such substances, and neutralizing the solution with lactic acid.

31. The process of making lactic compounds from whey, comprising forming the lactic compound in solution in the whey, treating the solution to render undesired nitrogenous substances separable therefrom, separating such undesired substances from the solution, alkalinating the solution to render remaining undesired substances removable, removing such substances, and neutralizing the solution.

32. The process of making lactic compounds from whey, comprising forming the lactic compound in solution in the whey, heating the solution to render undesirable substances separable, removing such substances, alkalinating the solution to render remaining undesired substances removable, removing such substances and neutralizing the solution.

33. The process of making lactic compounds from whey, comprising forming the lactic compound in solution in the whey, neutralizing the solution, separating undesired nitrogenous substances from the solution, alkalinating the solution to render remaining undesired substances removable, removing such substances and neutralizing the solution.

34. The process of making lactic compounds from whey, comprising forming the lactic compound in solution in the whey, heating the solution while substantially in the state of neutrality to render undesired substances separable from the solution, separating such substances, alkalinating the solution to render remaining undesired substances removable, removing such substances and neutralizing the solution.

35. The process of making lactic compounds from whey comprising adding to the whey and reacting with the lactic acid therein, an acid-binding compound containing the cation of the lactic compound to be formed, converting lactose present in the whey into lactic acid, heating the whey, adjusting the whey to substantial neutrality, separating out undesired nitrogenous substances from the whey, alkalinating the whey, separating out undesired substances from the whey, and neutralizing the whey.

ARNOLD H. JOHNSON.
SAMUEL M. WEISBERG.
JAMES J. JOHNSON.
MILTON E. PARKER.